(12) United States Patent
Jose et al.

(10) Patent No.: US 9,002,872 B2
(45) Date of Patent: Apr. 7, 2015

(54) TECHNIQUES FOR PARALLEL PROCESSING OF DIRECTORY SEARCHES

(75) Inventors: Jaimon Jose, Bangalore (IN); Vithalprasad Jayendra Gaitonde, Bangalore (IN); Pradeep Kumar Rathi, Karnataka (IN)

(73) Assignee: Novell, Inc., Provo, UT (US)

(*) Notice: Subject to any disclaimer, the term of this patent is extended or adjusted under 35 U.S.C. 154(b) by 685 days.

(21) Appl. No.: 12/025,958

(22) Filed: Feb. 5, 2008

(65) Prior Publication Data

US 2009/0112818 A1    Apr. 30, 2009

(30) Foreign Application Priority Data

Oct. 30, 2007  (IN) .......................... 2272/DEL/2007

(51) Int. Cl.
*G06F 7/00* (2006.01)
*H04L 29/12* (2006.01)
*G06F 17/30* (2006.01)

(52) U.S. Cl.
CPC ...... *H04L 61/1523* (2013.01); *G06F 17/30445* (2013.01)

(58) Field of Classification Search
CPC .................................................. G06F 17/30445
USPC ......................................................... 707/764
See application file for complete search history.

(56) References Cited

U.S. PATENT DOCUMENTS

| 6,085,188 | A | 7/2000 | Bachmann et al. |
| 6,345,266 | B1 | 2/2002 | Ganguly et al. |
| 6,347,312 | B1 | 2/2002 | Byrne et al. |
| 6,356,892 | B1 | 3/2002 | Corn et al. |
| 6,910,032 | B2 * | 6/2005 | Carlson et al. ................ 707/769 |
| 7,016,945 | B2 | 3/2006 | Bellaton et al. |
| 7,035,846 | B2 | 4/2006 | Gupta et al. |
| 2001/0032299 | A1 * | 10/2001 | Teramoto ....................... 711/141 |
| 2005/0273397 | A1 * | 12/2005 | Jameson ......................... 705/26 |
| 2006/0047641 | A1 | 3/2006 | Keni |
| 2006/0123024 | A1 | 6/2006 | Sathyanarayan et al. |
| 2007/0220517 | A1 * | 9/2007 | Lippett .......................... 718/102 |

* cited by examiner

*Primary Examiner* — Ajith Jacob
(74) *Attorney, Agent, or Firm* — Schwegman Lundberg & Woessner, P.A.

(57) ABSTRACT

Techniques for parallel processing of directory searches are provided. A directory search is received on a multicore or multiprocessor architecture machine. At least two threads processing on different cores or processors of the machine handle different aspects of the directory search. A first thread identifies matches in the directory for the search and serially populates the matches to search results. The second thread serially and in parallel grabs the matches in the search results and filters some out and modifies other ones of them to complete processing on the search. The search results are then returned to an initial requester making the initial search.

21 Claims, 4 Drawing Sheets

TECHNIQUES FOR PARALLEL PROCESSING OF DIRECTORY SEARCHES

RELATED APPLICATIONS

This application claims the benefit of priority to India Patent Application No. 2272/DEL/2007 filed in the India Patent Office on Oct. 30, 2007 and entitled "TECHNIQUES FOR PARALLEL PROCESSING OF DIRECTORY SEARCHES;" the disclosure of which is incorporated by reference herein.

BACKGROUND

Devices are becoming increasingly more powerful and smaller. In fact, many single devices now have multiple processors or multiple cores. Each processor or core capable, within a single device, of independently and concurrently processing instructions and data from that which is being processed by other processors or cores of that single device.

However, even if a single device is capable of processing multiple instructions concurrently on different processors or cores, if the software is not capable of being executed in parallel then this excess computing capacity is lost or grossly underutilized. Thus, software processes must be modified to take advantage of the newly developing computing capabilities.

Many software vendors have taken advantage of this situation by developing software that is multi-threaded. This means duplicate instances of a software module or service can concurrently and independently execute within a single device on multiple processors or cores. In some cases, the independent processing is coordinated by a software driver or manager to decompose a set of data for processing by multiple threaded software instances; the driver then assembles the results to present a single view of the processed data to a user.

One area that has not been addressed in any significant detail is that of directory services. In fact, most operating system or lower level user or application-support services have not been significantly enhanced to perform efficiently on multiple processors or cores within a single device.

In the case of directory services, search performance of a directory is a major criterion used to evaluate a particular directory vis-à-vis another directory. Search performance is mostly evaluated in terms of transactions per second using a multithreaded client. Though this technique is fine for directories with heavy load due to many clients executing the search at the same time; yet, most of the time the search operation is so fast that in real-world scenarios there is no need or desire on the part of the industry to process the searches in parallel or even detect the need for improvement. But, there are other situations that large enterprises regularly encounter where many searches and clients are involved and having parallel processing capability would prove useful. In fact, even with fast searches there is a lot of room for improvement that can be made for directory users.

Consequently, there is a need for improved techniques for directory search processing that utilizes multicore and multiprocessor architectures.

SUMMARY

In various embodiments, techniques for parallel processing of directory searches are provided. In an embodiment, a method for parallel processing of directory searches is provided. More specifically, a directory search is received and is processed thread by thread in a directory application, which matches the entries from the directory and populates a response data structure with the matched entries. Concurrently, two or more additional threads in the directory application are processed that access the search results data structure while a first thread continues to populate the search results data structure. Two or more additional threads modify the search results data structure to remove selective ones of the matching directory entries in response to scope and access rights and to modify other ones of the matching directory entries to include metadata information defined by the directory search. Finally, the search results data structure is returned to a requester once the first thread and the two or more additional threads complete processing of the directory search.

DETAILED DESCRIPTION

Figure 1:
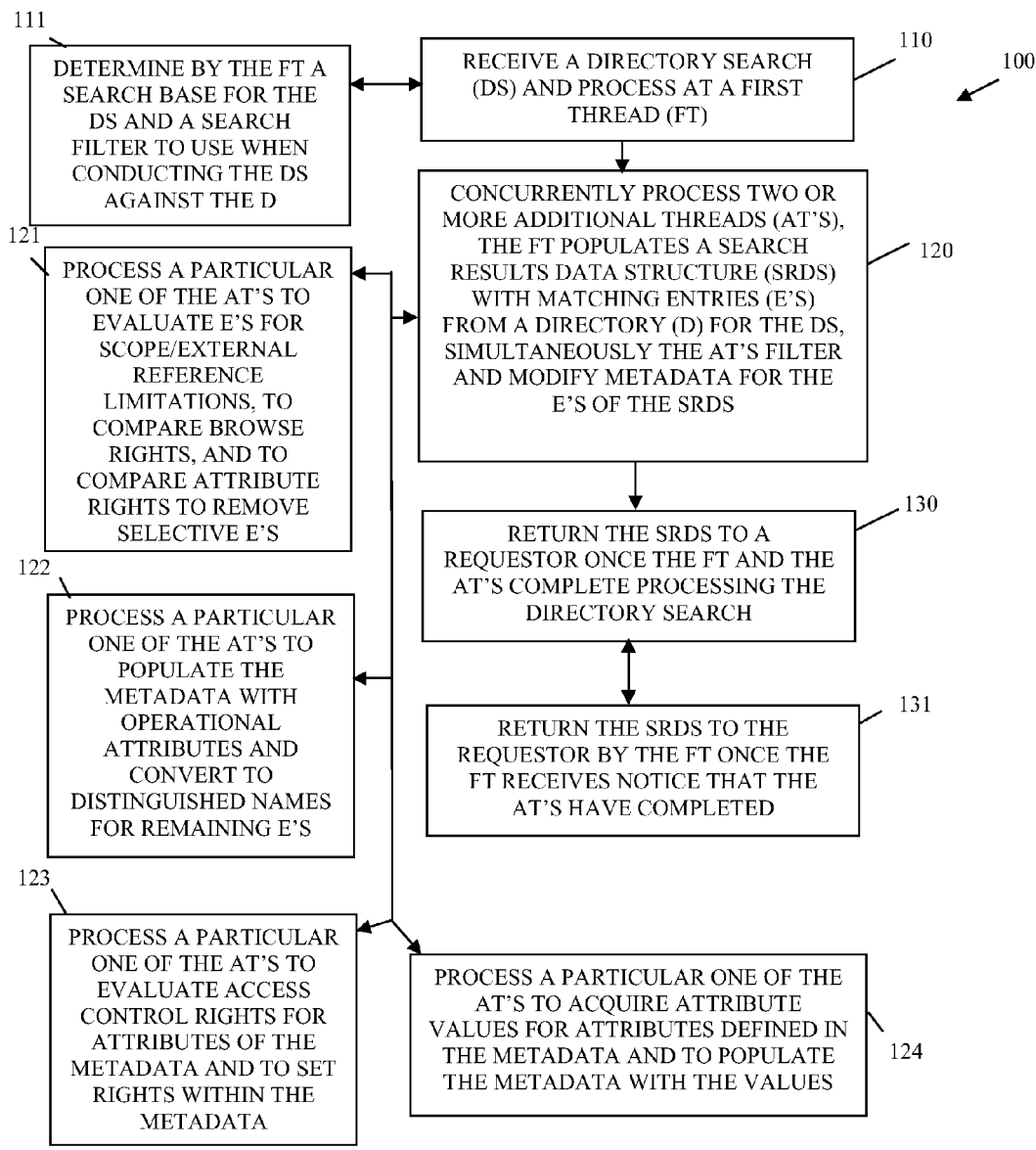
FIG. 1 is a diagram of a method for parallel processing of a directory search, according to an example embodiment.

A "resource" includes a user, content, a processing device, a node, a service, an application, a system, a directory, a data store, a World-Wide Web (WWW) site, an end-user, groups of users, combinations of these things, etc. The terms "service," "module," and "application" may be used interchangeably herein and refer to a type of software resource that includes instructions, which when executed by a machine performs operations that change the state of the machine and that may produce output.

A "thread" is a special type of application or module that is designed to process in parallel and concurrently with other threads. Thus, a thread is an application that can be parallel processed.

A "client" is an environment having one or more machines (processing devices, such as but not limited to a computer) that is enabled over a network and that includes resources and in some cases processes the resources. A "server" is also an environment having one or more machines that is enabled over a network and that includes resources and in some cases processes the resources. The terms "client" and "server" when used in combination define a client-server architecture, where the client and server are remote from one another over a network connection, such as a wide-area network (WAN) or a local-area network (LAN).

An "ACL" (Access Control List) is a list of permissions attached to a resource (can also be referred to as an object). The list specifies who or what resource is allowed to access the object in question and what operations are allowed to be performed on that object.

An "attribute" is a single property of an object (resource). An object is described by values assigned to its attribute names. For example, a car can be described by its attributes: make, model, color, and so on. The term "attribute" is often used interchangeably with property, which means the same thing. Attributes are also data items used to describe objects that are represented by the classes defined in a schema definition. Attributes are defined in the schema separately from the classes; this allows a single attribute definition to be applied to many classes.

A directory "entry id" is a unique identifier in a local database that represents an object (resource) within a directory. Typically, this is a 32-bit number.

A "search base" is a distinguished name of a search base object for a directory. This defines the location within the directory from which a directory search is to begin. In an embodiment, the directory search is formatted as a Lightweight Directory Access Protocol (LDAP) directory search.

A "DN" (distinguished name) is a label given to every entry in a directory. Each entry has a distinguished name, which uniquely and unambiguously identifies the entry. The properties or attributes of the DN are derived from a directory tree structure of information. The DN of any particular entry for an object (resource) is made from the DN of its superior entry in the tree structure, together with specially nominated attribute values of the entry. See for example X.500 for more details on DN and how it is formed and used.

"Scope" defines how deep to search within the directory. A base or zero level scope indicates a search of the base object only. One level indicates a search of objects immediately subordinate to the base object, but does not include the base object itself. A sub-tree level indicates a search of the base object and the entire sub-tree of which the base object's DN is the topmost object.

An "external reference" is a place holder that stores information about a directory object that is not held in a local partition of the directory.

A "subordinate reference" is a knowledge reference containing information about a DSA (Directory System Agent). The subordinate reference holds a specific subordinate entry or entry copy. Again, see X.500 for more details on a subordinate reference and its usage.

A "partition" is a logical grouping of a particular section of a directory tree.

An "operational attribute" is an attribute representing operational and/or administrative information for an object (resource).

An "attribute list" is a list of attributes requested by a client for entries matching a given search criteria as specified in a search filter.

A "search filter" expresses one or more conditions that a directory entry or a compound entry, within the directory, is to satisfy in order to be returned as part of an outcome for a search (search results).

Various embodiments of this invention can be implemented in existing network architectures, directories, storage systems, security systems, data centers, and/or communication devices. For example, in some embodiments, the techniques presented herein are implemented in whole or in part in the eDirectory® product distributed by Novell®, Inc., of Provo, Utah.

Of course, the embodiments of the invention can be implemented in a variety of architectural platforms, directories, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

FIG. 1 is a diagram of a method 100 for parallel processing of a directory search, according to an example embodiment. The method 100 (hereinafter "directory search service") is implemented as instructions in a machine-accessible and computer-readable medium. The instructions when executed by a machine (computer or processing device) perform the processing depicted in FIG. 1. The directory search service is also operational over and processes within a network. The network may be wired, wireless, or a combination of wired and wireless.

The directory search service executes on a multicore architecture machine or a multiprocessor architecture machine. This means that parallel or concurrent processing is capable, such that as one processor or core executes some applications or services anther processor or core simultaneously and in parallel executes other applications or services. As will be described more completely herein and below, the directory search service decomposes a traditional directory search into a series of threads for the directory search application, each thread capable of being processed in parallel with the remaining threads and on different cores or processors of the machine (computer or processing device).

At 110, the directory search service receives a directory search from a requester, such as a user or automated service. The request is directory search is also received from a client associated with the requester. The directory search is processed at a first thread of a directory search application to retrieve matching directory entries from a directory. The located matching directory entries are serially and dynamically populated into a search results data structure as the matching directory entries are found by the first thread.

The first thread is thread that received the search request in the directory via a directory search application and that performs one component of that directory search. Typically, in addition to locating matching directory entries there are a series of other processing steps associated with processing a directory search. The first thread handles one component of these operations, which is locating matching or preliminary directory entries from the directory that appear to initially satisfy the directory search.

As will be discussed in greater herein below these other operations perform a variety of filtering, distinguished name resolution, access right enforcement, attribute setting, and the like. Conventionally, all these operations were performed by the directory search via a single application. By threaded it is meant the application is capable of being processed in parallel within a multicore or multiprocessor architecture.

In an embodiment, at 111, the first thread determines a search base for the directory search that identifies a location within the directory tree to begin the search. The first thread also determines a search filter that identifies conditions that the entries in the directory must satisfy to preliminarily be considered matching directory entries that the first thread streams and dynamically populates to the search results data structure.

As the first thread processes and populates the search results data structure with preliminary matching entries from the directory, two or more additional threads process to handle other features to satisfy the requested directory search.

Accordingly, at 120, the directory search service concurrently processes the two or more additional threads. Each of these additional threads concurrently process with one another on a different core or processor of the machine and concurrently process in parallel with the first thread as it continues to process through the directory looking for preliminary matching directory entries.

So, the first thread continues to traverse through the directory tree locating preliminary matching directory entries that appear to initial satisfy the directory search. As and during this processing, each of the two or more additional threads process directory entries that the first thread has already populated to the search results data structure and perform a different aspect needed to completely satisfy the directory search. Some of these operations include removing selective ones of the matching directory entries from the search results data structure in response to scope and access rights limitations and modifying metadata information associated with other ones of the directory entries that remain in the search results data structure.

A variety of operations can be concurrently processed against the search results data structure that the first thread dynamically builds.

For example, at 121, the directory search service may concurrently process a particular additional thread to evaluate the directory entries in the search results data structure for scope and external reference limitations. This particular thread may also compare browse rights and compare attribute rights for purposes of removing some selective ones of the directory entries from the search results data structure.

As an example, consider a particular additional thread associated with the processing of 121 that processes against a partitioned directory. There can be sub-partitions within the directory in this case, which are not local and not hosted on the server associated with the directory search service. Here, one partition may include partition directory roots as ou=example, o=novell, where both these are held on server 1 and another partition root as o=novell is held on server 2. If the directory search is being conducted on server 1, with the search base as o=novell, then the particular threaded application returns a referral to o=novell. Directory entry browse rights and attribute compare rights (for attributes defined in the search filter) are also evaluated on every directory entry populated in the search results data structure made by the first thread. For example, if the search filter is employeeID=1234 the requester or client making the directory search request should have attribute compare rights on the employeeID attribute.

At 122, the directory search service can process another particular thread that performs other features to satisfy the directory search. This thread populates the metadata information of the directory entries with operational attributes and converts directory entries to distinguished names for each of the remaining directory entries in the search results data structure that the thread in the processing at 121 has not removed. It is to be understood that the thread at 122 may process and populate metadata information and convert to distinguished names for some entries in the search results data structure before the thread at 121 has removed them. This is so because the threads are grabbing entries to process them as the first thread populates them to the search results data structure. But, eventually if an entry is to be removed it will be processed by the thread at 121 so there is no harm in this and it demonstrates that processing order is not significant because the end result is what the requestor wanted and was entitled to.

The directory maintains a set of operational attributes, which are present on every object (entry for a resource) in the directory. For example, entryID, revision, parented, subordinateCount, partitioned, creationTimeStamp, modificationTimeStamp, etc. The threaded application at 122 returns these operational attributes if requested in the directory search by the requester or client. Here, entryID, which is a unique identifier for the object in the local database, is converted to a distinguished name, which represents where in the directory tree hierarchy this particular object exists. It is noted that there can be multiple formats for a distinguished name (DN), such as typed or tuned.

In still another case, at 123, the directory search service concurrently processes another particular thread. This thread grabs the matching directory entries from the search results data structure for purposes of evaluating access control rights for attributes of the metadata and to set rights within the metadata.

The thread at 123 evaluates ACL read rights (similar to a LDAP search with typesOnly set to true or DS_ATTRIBUTE_NAMES where only attribute names are requested). The attribute list cache is maintained in the database entry cache. Caching can also occur for the ACL's at the container level.

In yet another situation, at 124, the directory search service concurrently processes yet another particular thread. This thread grabs matching directory entries from the search results data structure for purposes of obtaining attribute values for attributes defined in the metadata and to populate the metadata of the matching directory entries with those obtained values.

Once the database returns an entry that matches the search criteria (search filter) for the directory search, the thread that processes at 124 walks through the object for the entry and reads the attributes as requested by the requester or client one by one. Then, access rights calculations are processed based on the results of the values and final attribute values are noted in the metadata for that entry in the search results data structure.

In a particular embodiment, all 5 mentioned threads are concurrently processed as defined at 110, 121, 122, 123, and 124. It is noted that various combinations of these 5 can occur where some functions are subsumed into composite threads. In other words, a single thread can do the processing of 121 and 122 or even 123. In other cases, there are 5 independent concurrent threads as defined in 110, and 121-124.

At 130, the directory search service returns the search results data structure once the first thread and the additional threads complete processing of the directory search.

According to an embodiment, it is the first thread that returns the search results data structure to the initial requestor or client that initiated the directory search once the first thread receives notice or an event indicating that each of the additional threads have completed their processing.

The directory search service offers significant improvement of directory searches that utilize multicore or multiprocessor architectures. For instances, for directory sub tree searches where the returned results are greater than 1, the average response time is improved by nearly 30%. For base level searches, the directory service can reduce the average response times by about 12-15%.

Various initial configuration parameters to the directory search service can be made to determine when the directory search service should be beneficially processed to achieve improved performance. Some example scenarios for configuring the directory search service are presented below with reference to the method 200 and the FIG. 2.

Figure 2:
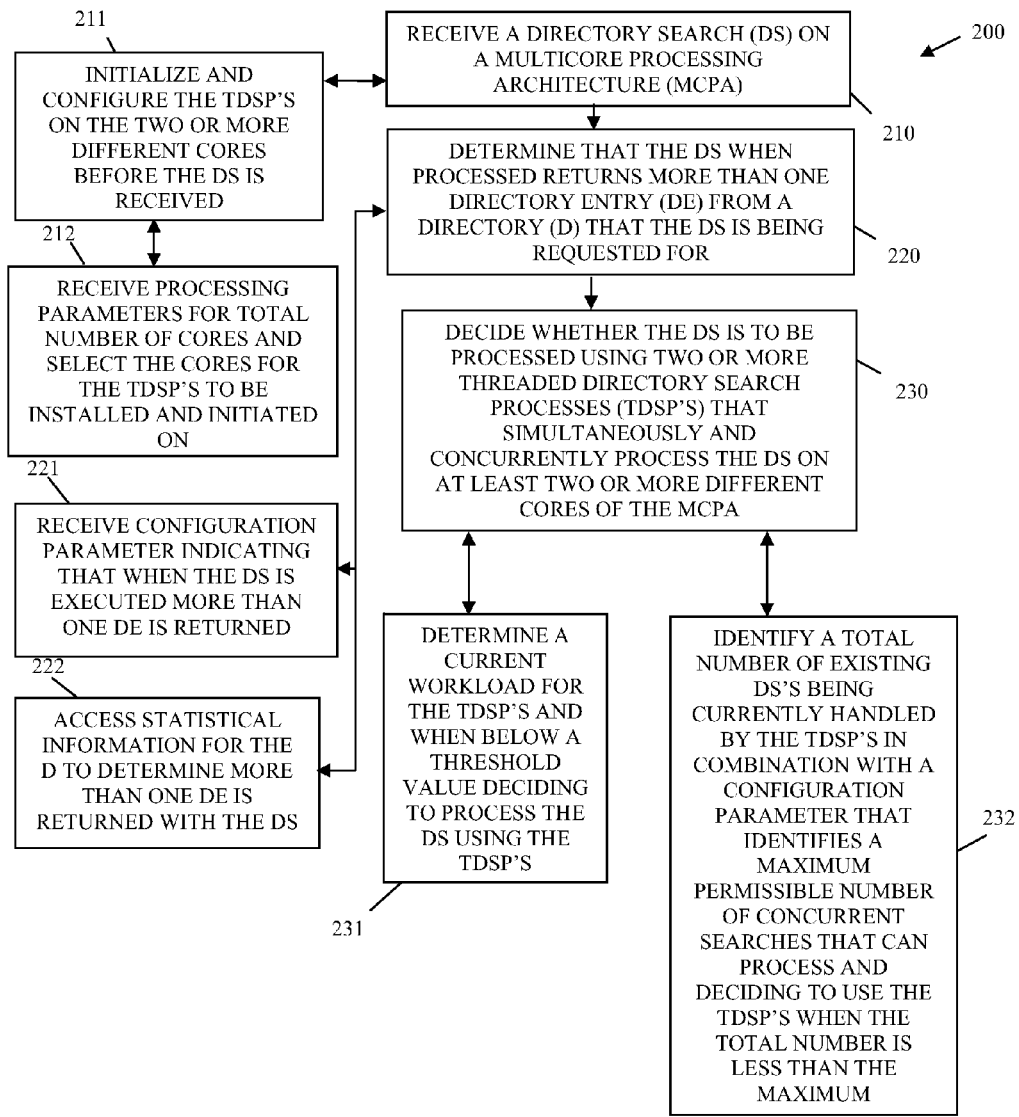
FIG. 2 is a diagram of another method for parallel processing of a directory search, according to an example embodiment.

FIG. 2 is a diagram of another method 200 for parallel processing of a directory search, according to an example embodiment. The method 200 (hereinafter "driver service") is implemented in a machine-accessible and readable medium as instructions. The instructions when executed by a machine perform the processing depicted in the FIG. 2. Moreover, the driver service is operational over a network, and the network may be wired, wireless, or a combination of wired and wireless.

In an embodiment, the driver service is an enhancement to the front-end processing associated with the directory search service that was in detail above with reference to the method 100 of the FIG. 1. The driver service also presents an alternative perspective to the method 100 of the FIG. 1.

Again, the driver service is operational within a multicore architecture or multiprocessor architecture of a machine. That machine may be a server located over a wide-area network (WAN), such as the Internet, that clients interact with to access a directory. In other cases the machine may be a service located over a local-area network (LAN) that clients interact with to access the directory.

At 210, the driver service receives a directory search on a multicore processing architecture.

According to an embodiment, at 211, the driver service initializes and configures threaded directory search processes on two or more different cores of the multicore processing architecture before the directory search is received. In other words, the processing at 211 precedes that of 210. It is noted that the FIG. 2 is not intended to impart any particular sequential processing order.

In another case, at 212, the driver service receives processing parameters for a total number of cores and selects particular ones of the available cores for the threaded directory search processes to be installed and instantiated on.

At 220, the driver service makes a determination that the directory search if and when executed against a desired directory will return more than one directory entry from that directory. This can be resolved in a number of ways.

For example, at 221, the driver service receives a configuration parameter indicating that when the directory search is executed more than one directory entry is going to be returned. This can be done via the search request itself as part of a parameter to the search request to force the parallel processing aspects of the driver service.

In still another case, at 222, the driver service accesses statistical directory information for the directory and determines based on quick inspection of that statistical information that more than one directory entry is going to be returned when the search is processed.

Other techniques may be used as well to determine before the directory search is actually processed that the search is going to return more than one directory entry.

At 230, the driver service decides whether the directory search is to be processed using two or more threaded directory search processes and concurrently processes the directory search on two or more different cores of the multicore architecture using the two or more threaded directory search processes. This was described in detail above with reference to the method 100 of the FIG. 1.

Again a variety of factors can be used to decide whether it is beneficial to process the directory search with the two or more threaded directory search processes.

For example, at 231, the driver service determines a current workload for the two or more threaded directory search processes and when the load falls below a configured threshold value, the driver service decides to process the directory search using the two or more threaded directory search processes.

In another case, at 232, the driver service identifies a total number of existing directory searches that are currently processing on the multicore architecture when the directory search is received for processing. This information can be used in combination with a configuration parameter that identifies a maximum permissible number of concurrent searches that can process. A comparison can be made and when the total number of existing directory searches falls below or is less than the maximum permissible number, the driver service uses the two or more threaded directory search processes to execute the directory search.

The driver service can be used to determine when the method 100 of the FIG. 1 is beneficial and useful to a requestor or client executing a search against a given directory. To this a variety of parameters or information can be used, such as but not limited to: a number of host processors or cores associated with the multicore architecture; current workload, such as using a LDAP host threadpool; number of active search operations and configuration parameter to determine how many searches should be executed using the approach discussed herein and above; and/or a configuration parameter to specify that the above mentioned approach should be used for searches that return greater than one directory entry.

Figure 3:
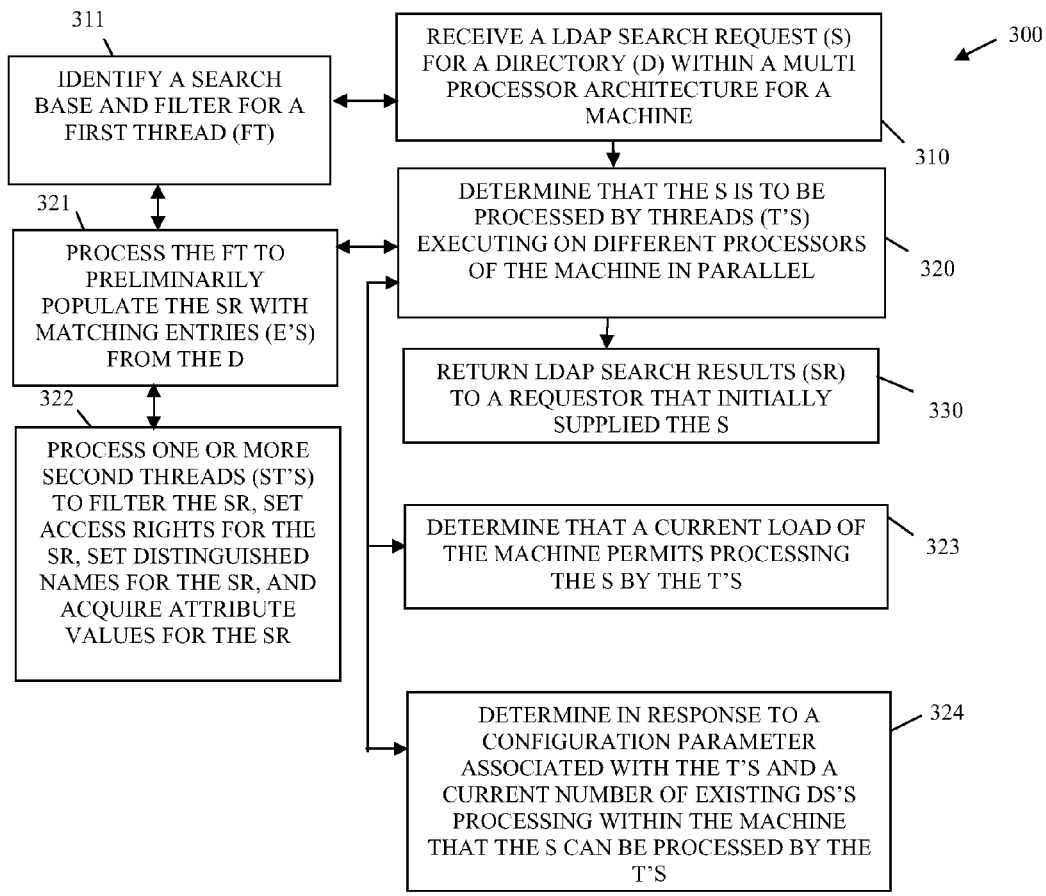
FIG. 3 is a diagram of yet another method for parallel processing of a directory search, according to an example embodiment.

FIG. 3 is a diagram of yet another method 300 for parallel processing of a directory search, according to an example embodiment. The method 300 (hereinafter "threaded directory service") is implemented in a machine-accessible and readable medium as instructions. The instructions when executed by a machine perform the processing depicted in the FIG. 3. Moreover, the threaded directory service is operational over a network, and the network may be wired, wireless, or a combination of wired and wireless.

The threaded directory service represents alternative and in some instances enhanced processing associated with the methods 100 and 200 of the FIGS. 2 and 3, respectively (discussed in detail above). The threaded directory service operates within the context of a LDAP environment.

Once again it is noted that the threaded directory service executes and is operational within a multicore or multiprocessor machine environment. The threaded directory service can be installed and processed on a server accessible via a WAN connection or a LAN connection in a client-server architecture.

At 310, the threaded directory service receives a LDAP search request for a directory within a multi processor architecture for a machine.

According to an embodiment, at 311, the threaded directory service identifies a search base and search filter for a first threaded application.

At 320, the threaded directory service determines that the search is to be processed by threads. The threads execute on different processors of the machine and processing in parallel to one another to fully process the LDAP search request.

In an embodiment, at 321, the threaded directory service processes the first thread, identified at 311, to preliminarily populate the search results for the search with matching entries acquired from the directory in response to the search filter and search base.

In still another situation, at 322, the threaded directory service processes one or more second threads to filter the search results, to set access rights for the search results, to set distinguished names for the search results, and to acquire attribute values for the search results.

In an embodiment, at 323, the threaded directory service determines that a current load of the machine permits processing the search by the threads. In still another case, at 324, the threaded directory service determines in response to a configuration parameter associated with the threads and in response to a current number of existing directory services processing within the machine that the search can be processed by the threads. Examples for making this determination were discussed in detail above with reference to the method 200 of the FIG. 2.

At 330, the threaded directory service returns the LDAP search results to a requester that initially supplied the LDAP search request.

Figure 4:
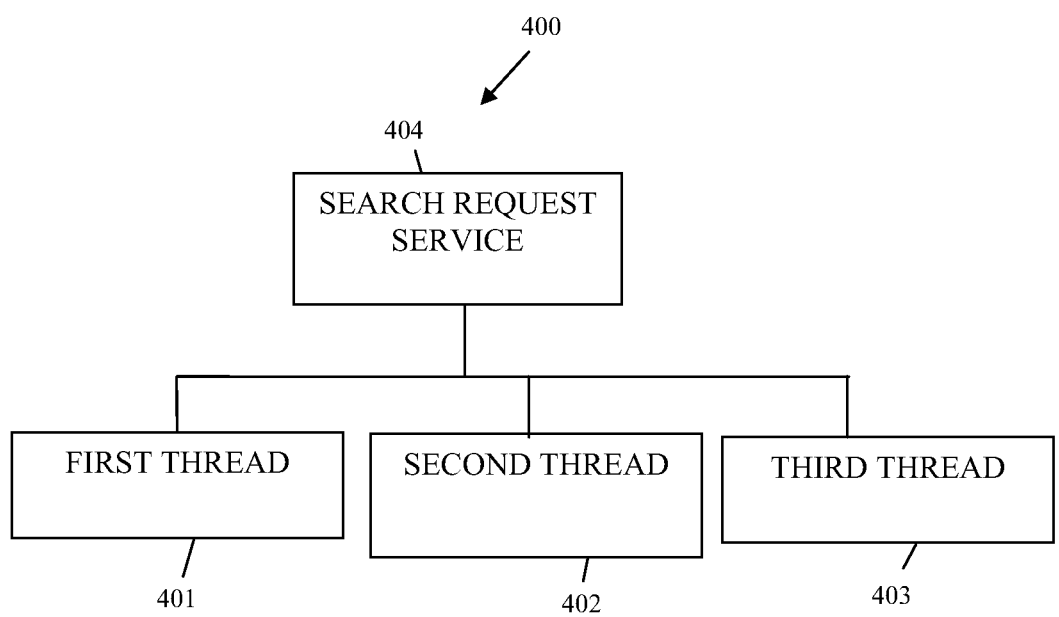
FIG. 4 is a diagram of a directory search parallel processing system, according to an example embodiment.

FIG. 4 is a diagram of a directory search parallel processing system 400, according to an example embodiment. The directory search parallel processing system 400 is implemented as instructions on or within a machine-accessible and readable medium. The instructions when executed by one or more machines perform, among other things, processing depicted with respect to the methods 100, 200, and 300 of the FIGS. 1-3, respectively. The directory search parallel processing system 400 is also operational over a network, and the network may be wired, wireless, or a combination of wired and wireless.

The directory search parallel processing system 400 includes a first thread 401 and a second thread 402. In some cases, the directory search parallel processing system 400 also includes a third thread 402 and/or a search request service 403. Each of these and their interactions with one another will now be discussed in turn.

Initially, it is noted that the components of the directory search parallel processing system 400 execute and are implemented within a multicore machine architecture or a multiprocessor machine architecture, which permits parallel processing or simultaneous processing of the individual components.

The first thread 401 is implemented in a machine-accessible and computer-readable medium and is to process on a first processor of a machine. Some example processing associated with the first thread 401 is presented above with reference to the methods 100, 200, and 300 of the FIGS. 1-3, respectively.

The first thread 401 processes in parallel and concurrent with the second thread 402 on the machine. The first thread 401 acquires directory entries that match a requested directory search from a directory and serially and dynamically populates search results as they are acquired. Once the second thread 402 completes processing on each of the search results and any additional threads, such as a third thread 403 (discussed below), the first thread 401 returns the final search results to an initial requestor that supplied the directory search.

The second thread 402 is implemented in a machine-accessible and computer-readable medium and is to process on a second processor of the machine. Again, example processing associated with the second thread 402 was presented in detail above with reference to the methods 100, 200, and 300 of the FIGS. 1-3, respectively.

The second thread 402 is processed concurrent with the first thread 401 and accesses the serially and dynamically populated search results as they are populated and then filters out some of them and modifies remaining ones of them. Example processing associated with operations that the second thread 402 performs was discussed in detail above with reference to the method 100 of the FIG. 1.

In some embodiments, the directory search parallel processing system 400 also includes a third thread 403. The third thread 403 is implemented in a machine-accessible and computer-readable medium and is to process on a third processor of the machine. Example processing associated with the third thread 403 was presented in detail above with reference to the methods 100, 200, and 300 of the FIGS. 1-3, respectively.

The third thread 403 processes in parallel within the machine with the first thread 401 and the second thread 402. The third thread 403 can be used to augment and compliment the second thread 402 and perform other filtering and modifying actions on the search results.

According to an embodiment, the directory search parallel processing system 400 also includes a search request service 404. The search request service 404 is implemented in a machine-accessible and computer-readable medium and is to process on the first or the second processor of the machine. Example processing associated with the search request service 404 was presented in detail above with reference to the method 200 of the FIG. 2.

The search request service 404 initially decides whether the directory search is to be processed in parallel on the machine by the first threaded application 401 and the second threaded application 402. Various configuration parameters and dynamically determined conditions can be used to assist the search request service 404.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:

evaluating a lightweight directory access protocol (LDAP) directory search based on configuration parameters to the method and determining based on the evaluation that the directory search is to be processed by the method, the configuration parameters passed as part of the directory search and including a current workload for a multicore architecture and a number that identifies active search operations within the multicore architecture, the configuration parameters also including an indication as to how many searches should be executed;

receiving the directory search and processing at a first thread and on a first processor to retrieve matching directory entries from a directory to satisfy the directory search and serially and dynamically populating the matching entries into a search results data structure as the matching directory entries are found by the first thread;

concurrently processing two or more additional threads on a different processor that access the search results data structure while the first thread continues to populate the search results data structure to satisfy the directory search, the two or more additional threads process in parallel to the first thread and on a different core of a machine from that of the first thread based on the configuration parameters that force the concurrent processing, the two or more additional threads modify the search results data structure to remove selective ones of the matching directory entries in response to scope and access rights and to modify other ones of the matching directory entries remaining in the search results data structure to include metadata information. defined by the directory search, the scope defines how deep to search within the directory, the metadata defining particular attributes, the scope includes a value for: a base scope indicating just a search of a base object only is to occur, a level one indicating a search of objects subordinate to the base object but does not include the base object, or a sial-tree level indicating a search of the base object and an entire sub-tree of which a distinguished name for the base object is a topmost object; and returning the search results data structure to a requestor once the first thread and the two or more additional threads complete processing of the directory search, the first thread returns the search results data structure to the requestor once the first thread receives notice or receives a particular event indicating that each of the two or more additional threads have completed processing, and wherein each object includes operational attributes including values for an entry identifier, revision information, parent information, a subordinate count, partitioned information, creation time stamp, and modification time stamp.

2. The method of claim 1, wherein concurrently processing further includes processing a particular thread as one of the two or more additional threads to evaluate the matching directory entries for scope/external reference limitations, to compare browse rights, and to compare attribute rights, and wherein the particular thread removes the selective ones of the directory entries from the search results data structure in response to its processing.

3. The method of claim 1, wherein concurrently processing further includes processing a particular thread as one of the two or more additional threads to populate the metadata of the other ones of the matching directory entries within the search results data structure with operational attributes and to convert the other ones of the matching directory entries into distinguished names within the search results data structure.

4. The method of claim 1, wherein concurrently processing further includes processing a particular thread as one of the two or more additional thread to evaluate access control rights for attributes defined in the metadata of the other ones of the matching directory entries and to set particular access control rights within that metadata.

5. The method of claim 1, wherein concurrently processing further includes processing a particular thread as one of the two or more additional threads to acquire attribute values for attributes defined in the metadata for the other ones of the matching directory entries and to populate the metadata with these attribute values.

6. The method of claim 1, wherein returning further includes returning the search results data structure to the requestor by the first thread once the first thread receives a notice that the two or more additional threads have completed processing.

7. The method of claim 1, wherein receiving further includes determining by the first thread a search base for the directory search that identifies a location to initiate the search within the directory and determining by the first thread a search filter to use when conducting the search from the search location, wherein the search filter expresses one or more conditions used to locate the matching directory entries.

8. A machine-implemented method, comprising:
receiving a lightweight directory access protocol (LDAP) directory search on a multicore processing architecture;
determining that the directory search when processed returns more than one directory entry from a directory that the directory search is being requested for, wherein determining includes evaluating statistical directory information for the directory and performing an inspection of that statistical directory information to identify that more than one directory entry is returned when the directory search is executed; and deciding to process the directory search using two or more threaded directory search processes that simultaneously and concurrently process the directory search on at least two or more different cores of the multicore architecture based on configuration parameters that force concurrent processing, the decision to process the directory search uses information that identifies: a total number of host processors or cores available, a current workload for the host processors or the cores, a total number of active search operations within the host processors or the cores, and the configuration parameters indicating how many searches should be used at any given time, the two or more threaded directory search processes modify results retrieved from the directory search to selectively remove some results based on scope and access rights for the removed results, each thread processed on a different core of machine, the scope defines how deep to search within the directory and the two or more threaded directory search processes modify attributes in remaining results for the directory search, the scope includes a value for: a base scope indicating just a search of a base object only is to occur, a level one indicating a search of objects subordinate to the base object but does not include the base object, or a sub-tree level indicating a search of the base object and an entire sub-tree of which a distinguished name for the base object is a topmost object, and wherein each object includes operational attributes including values for an entry identifier, revision information, parent information, a subordinate count, partitioned information, creation time stamp, and modification time stamp.

9. The method of claim 8 further comprising, initializing and configuring the two or more processes on the at least two or more different cores before the directory search is received.

10. The method of claim 9, wherein initializing and configuring further includes receiving processing parameters identifying a total number of cores on the multicore architecture and selecting the at least two or more different cores for the two or more threaded directory search processes to be installed and initiated on.

11. The method of claim 8, wherein determining further includes receiving a configuration parameter that indicates the directory search when processed returns more than one directory entry.

12. The method of claim 8, wherein deciding further includes determining a current workload for the two or more threaded directory search processes and when the workload falls below a threshold value deciding to process the directory search using the two or more threaded directory search processes on the at least two more different cores of the multicore architecture.

13. The method of claim 8, wherein deciding further includes identifying a total number of existing directory searches being handled by the two or more threaded directory search processes in combination with a configuration parameter that identifies a maximum permissible number of concurrent searches that can process and deciding to process the directory search using the two or more threaded directory search processes on the at least two more different cores of the multicore architecture when the total number is less than the maximum permissible number.

14. A machine-implemented method, comprising:
- receiving a lightweight directory access protocol (LDAP) search request for a directory within a multi processor architecture for a machine;
- determining that the LDAP search request is to be processed by threads based on evaluation of a configuration parameter to the method, the configuration parameter provided as part of the LDAP search request and the configuration parameter including a current workload for a multicore architecture and a number for active search operations processing on the multicore architecture, and a number of searches that should be executed, and each thread executing on a different processor and different core of the machine and each thread performing a different operation to satisfy the LDAP search request, one thread performs the directory search and two or more threads modify results returned from the directory search to selectively remove some of the results based on scope and access rights, the scope defines how deep to search within the directory, and the two or more threads also modify attributes of remaining results, and each thread processed in parallel within the machine with respect to remaining ones of the threads based on the configuration parameters that force parallel processing, the scope includes a value for: a base scope indicating just a search of a base object only is to occur, a level one indicating a search of objects subordinate to the base object but does not include the base object, or a sub-tree level indicating a search of the base object and an entire sub-tree of which a distinguished name for the base object is a topmost object; and
- return LDAP search results to a requestor that initially supplied the LDAP search request once the thread that performs the directory search receives notice or receives a particular event indicating that each of the two or more additional threads have completed processing, and wherein each object includes operational attributes including values for an entry identifier, revision information, parent information, a subordinate count, partitioned information, creation time stamp, and modification time stamp.

15. The method of claim 14, wherein receiving further includes identifying a search base and a search filter for the LDAP search request, the search base identifies for a first one of the threads a search location to initiate a search within the directory and the search filter identifies conditions that the first one of the threads evaluates to determine when entries within the directory are considered to preliminarily match the LDAP search request.

16. The method of claim 15, wherein determining further includes processing the first one of the threads to preliminarily populate the LDAP search results with matching entries from the directory.

17. The method of claim 16, wherein determining processing one or more second threads to filter the search results, set access rights for the search results, set distinguished names for the search results, and acquire attribute values for the search results.

18. The method of claim 14, wherein determining further includes determining that a current load of the machine permits processing of the LDAP search request by the threads.

19. The method of claim 14, wherein determining further includes determining in response to the configuration parameter associated with the threads and a current number of existing directory searches processing within the machine that the LDAP search request can be processed by the threads.

20. A machine-implemented system, comprising:
- a first thread implemented in a machine-accessible and readable medium and to process on a first processor of a machine; and
- a second thread implemented in a machine-accessible and readable medium and to process on a second processor of the machine;
- wherein a search request service initially decides that a requested lightweight directory access protocol (LDAP) directory search is to be processed in parallel on the machine by the first and the second threads by evaluating dynamic conditions and configuration parameters, the configuration parameters part of the requested directory search and the configuration parameters including a current workload for a multicore architecture and a number for active search operations processing on the multicore architecture, and the configuration parameters force parallel processing, and a number of searches that should be executed, and the first thread processes in parallel and concurrent with the second thread on the machine, the first thread and the second thread processing in parallel on different cores of the machine, and the first thread acquires directory entries that match the requested directory search and that satisfies the search from a directory and serially and dynamically populates search results for the directory search, and the second thread accesses the serially populated search results as they are populated and filters out some of them from the search results and modifies remaining ones of them within the search results, removed ones of the search results are removed based on scope and access rights, where scope defines how deep to search within the directory, and when the second thread completes processing, the first thread returns the search results to an initial requestor that supplied the directory search once the first thread receives notice or receives a particular event indicating that the second thread has completed processing, the scope includes a value for: a base scope indicating just a search of a base object only is to occur, a level one indicating a search of objects subordinate to the base object but does not include the base object, or a sub-tree level indicating a search of the base object and an entire sub-tree of which a distinguished name for the base object is a topmost object, and wherein each object includes operational attributes including values for an entry identifier, revision information, parent information, a subordinate count, partitioned information, creation time stamp and modification time stamp.

21. The system of claim 20 further comprising, a third thread that is implemented in a machine accessible and readable medium and that processes on a third processor of the machine, wherein the third thread processes in parallel within the machine with the first and the second threads and the third thread performs other filtering and modifying actions on the search results to complement the second thread.

* * * * *

UNITED STATES PATENT AND TRADEMARK OFFICE
CERTIFICATE OF CORRECTION

PATENT NO.        : 9,002,872 B2                                    Page 1 of 1
APPLICATION NO.   : 12/025958
DATED             : April 7, 2015
INVENTOR(S)       : Jose et al.

It is certified that error appears in the above-identified patent and that said Letters Patent is hereby corrected as shown below:

On the Title page, in item (57), in "Abstract", in column 2, line 11, delete "requester" and insert --requestor--, therefor In the Claims In column 10, line 66, in Claim 1, delete "information." and insert --information--, therefor In column 11, line 6, in Claim 1, delete "sial-tree" and insert --sub-tree--, therefor In column 13, line 1, in Claim 14, delete "machine-imp.lemented" and insert --machine-implemented--, therefor In column 14, line 53, in Claim 20, after "stamp", insert --,--, therefor In column 14, line 55, in Claim 21, delete "machine accessible" and insert --machine-accessible--, therefor Signed and Sealed this
Tenth Day of November, 2015

Michelle K. Lee
*Director of the United States Patent and Trademark Office*